United States Patent
Cohen-Arazi et al.

(10) Patent No.: US 9,119,121 B2
(45) Date of Patent: Aug. 25, 2015

(54) SYSTEMS AND METHODS FOR WLAN ROAMING

(71) Applicant: QUALCOMM Incorporated, San Diego, CA (US)

(72) Inventors: Yacob Cohen-Arazi, San Diego, CA (US); George Cherian, San Diego, CA (US); Maksim Krasnyanskiy, San Diego, CA (US); Santosh Paul Abraham, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 209 days.

(21) Appl. No.: 13/891,713

(22) Filed: May 10, 2013

(65) Prior Publication Data

US 2014/0334438 A1 Nov. 13, 2014

(51) Int. Cl.
| | |
|---|---|
| *H04W 4/00* | (2009.01) |
| *H04W 36/00* | (2009.01) |
| *H04W 8/02* | (2009.01) |
| *H04W 8/26* | (2009.01) |
| *H04W 36/08* | (2009.01) |
| *H04W 84/12* | (2009.01) |
| *H04L 29/12* | (2006.01) |

(52) U.S. Cl.
CPC ............ *H04W 36/0077* (2013.01); *H04W 8/02* (2013.01); *H04W 36/0011* (2013.01); *H04L 61/103* (2013.01); *H04L 61/2015* (2013.01); *H04L 61/2053* (2013.01); *H04W 8/26* (2013.01); *H04W 36/08* (2013.01); *H04W 84/12* (2013.01)

(58) Field of Classification Search
USPC .................. 370/230–331, 338–349, 392–401; 455/436–443
See application file for complete search history.

(56) References Cited

U.S. PATENT DOCUMENTS

| | | | |
|---|---|---|---|
| 7,586,879 B2 | 9/2009 | Chari et al. | |
| 7,596,376 B2* | 9/2009 | Calhoun et al. | 455/436 |
| 7,599,330 B2* | 10/2009 | Lee et al. | 370/331 |
| 7,835,317 B2* | 11/2010 | Ahmavaara et al. | 370/328 |
| 7,852,787 B2* | 12/2010 | Gelbman et al. | 370/254 |
| 8,184,588 B2* | 5/2012 | Park et al. | 370/331 |
| 8,391,969 B2* | 3/2013 | Sato | 600/547 |
| 8,477,715 B2* | 7/2013 | Bahini et al. | 370/331 |
| 8,897,778 B2* | 11/2014 | Ghosal et al. | 455/436 |
| 2002/0136226 A1* | 9/2002 | Christoffel et al. | 370/401 |
| 2004/0253954 A1 | 12/2004 | Lee et al. | |
| 2006/0291425 A1 | 12/2006 | Park et al. | |
| 2008/0019319 A1 | 1/2008 | Bahini et al. | |
| 2008/0165735 A1 | 7/2008 | Chen et al. | |

(Continued)

OTHER PUBLICATIONS

Forte A.G. et al., "Improving Layer 3 Handoff Delay in IEEE 802.11 Wireless Networks," WICON'06, The 2nd International Wireless Internet Conference, Aug. 2-5, 2006, pp. 1-8.

(Continued)

*Primary Examiner* — Man Phan
(74) *Attorney, Agent, or Firm* — Bay Area Technology Law Group PC (57) ABSTRACT

Systems and methods are provided to improve roaming performance and to minimize disruptions in connectivity. When roaming between a source AP and a target AP, the device determines whether the APs employ different gateways, such as through an ARP exchange. If the source and target APs have different gateways, a DHCP exchange is used to renew the IP address of the device to restore network connectivity.

21 Claims, 3 Drawing Sheets

(56) References Cited

U.S. PATENT DOCUMENTS

| | | |
|---|---|---|
| 2008/0285520 A1 | 11/2008 | Forte et al. |
| 2012/0106514 A1* | 5/2012 | Zheng et al. .................. 370/331 |
| 2012/0120915 A1 | 5/2012 | Wang et al. |
| 2013/0031615 A1* | 1/2013 | Woodward et al. ............... 726/4 |

OTHER PUBLICATIONS

International Search Report and Written Opinion—PCT/US2014/037583—ISA/EPO—Oct. 17, 2014.

* cited by examiner

SYSTEMS AND METHODS FOR WLAN ROAMING

FIELD OF THE PRESENT DISCLOSURE

This disclosure generally relates to wireless communication systems and more specifically to systems and methods for a client device roaming between access points.

BACKGROUND

Wireless local area networks (WLANs) conforming to specifications in the Institute of Electrical and Electronics Engineers ("IEEE") 802.11 family typically involve a basic service set (BSS) managed by a device acting in the role of an access point (AP). Typically, the AP is connected through a gateway to a wide area network (WAN), such as the Internet. Since a given AP has a limited range, a mobile device that is associated with one AP, a source AP, may need to disassociate from that AP when moving out of range and form an association with a new AP, a target AP, providing coverage in the current location of the mobile device. The process of moving from source AP to target AP is known as roaming.

Connection of the mobile device to the WAN through an AP involves communications at the network layer (layer 3) of the Open Systems Interconnection (OSI) model and requires that the mobile device have a valid network address. In the context of communications over the Internet, the mobile device employs an internet protocol (IP) address that is assigned to it using the dynamic host configuration protocol (DHCP).

When roaming from the source AP to the target AP, the current IP address assigned to the mobile device remains valid when the source AP and the target AP are connected to the WAN through the same gateway. Many enterprise level network deployments utilize configurations that involve multiple APs sharing the same service set identifier (SSID) that are connected through a common gateway. Accordingly, the mobile device may assume a target AP having the same SSID as the source AP share the same gateway. If so, the IP address for a mobile device roaming between such APs remains valid and communications with the WAN are substantially uninterrupted when moving from the source AP to the target AP. As a result, conventional roaming processes may assume that a source AP and a target AP sharing an SSID are connected to the WAN through a common gateway and provide no mechanism for renewing the IP address of a roaming device.

However, when the source AP and the target AP are connected to different gateways, the IP address of the mobile device may not remain valid following a roaming event and layer 3 connectivity may be disrupted. Accordingly, it would be desirable to provide improved roaming performance and minimize disruptions in connectivity. The systems and methods of this disclosure provide a roaming process between a source AP and a target AP having different gateways that rapidly restores network connectivity to satisfy these and other goals.

SUMMARY

This disclosure includes methods for communication in a wireless communications device roaming from a source access point (AP) to a target AP. In one embodiment, such a method may include determining first identification information for a gateway of the source AP, roaming from the source AP to a target AP, determining second identification information for a gateway of the target AP using an address resolution protocol (ARP) exchange, comparing the first identification information and the second identification information, and renewing a network address of the wireless communications device when the first identification information and the second identification information indicates the gateway of the target AP is not the same as the gateway of the source AP. Determining second identification information for the gateway of the target AP may include obtaining a media access control (MAC) address of the gateway of the target AP.

In one aspect, the network address is an internet protocol (IP) address. Further, renewing the IP address may include performing a dynamic host configuration protocol (DHCP) exchange.

In another aspect, the target AP and the source AP may have the same IP subnet configurations. Alternatively, the target AP and the source AP may have different IP subnet configurations.

In yet another aspect, roaming from the source AP to a target AP may disrupt layer 3 connectivity such that renewing the network address of the wireless communications device restores layer 3 connectivity.

In still another aspect, the wireless communications device may determine whether a service set identification (SSID) of the target AP is the same as an SSID of the source AP before determining and comparing the second identification information.

This disclosure also involves systems for wireless communication, and may include a wireless communications device configured to roam from a source AP to a target AP. The wireless communications device may have a roaming manager configured to determine first identification information for a gateway of the source AP, determine second identification information for a gateway of the target AP using an ARP exchange and renew a network address of the wireless communications device when the first identification information and the second identification information indicates the gateway of the target AP is not the same as the gateway of the source AP. The roaming manager may determine second identification information for the gateway of the target AP by obtaining a MAC address of the gateway of the target AP.

In one aspect, the network address is an internet protocol (IP) address. Further, the roaming manager may renew the IP address by performing a DHCP exchange.

In another aspect, the target AP and the source AP may have the same IP subnet configurations. Alternatively, the target AP and the source AP may have different IP subnet configurations.

In yet another aspect, the roaming manager may determine whether an SSID of the target AP is the same as an SSID of the source AP before determining and comparing the second identification information.

This disclosure also includes a non-transitory processor-readable storage medium for a wireless communications device roaming from a source AP to a target AP. The processor-readable storage medium may have instructions which, when executed by a processor, cause the wireless communications device to determine first identification information for a gateway of the source AP, determine an SSID of the target AP is the same as an SSID of the source AP, determine second identification information for a gateway of the target AP using an ARP exchange and renew a network address of the wireless communications device when the first identification information and the second identification information indicates the gateway of the target AP is not the same as the gateway of the source AP. The instructions to determine second identification information for the gateway of the target AP may obtain a MAC address of the gateway of the target AP.

In one aspect, the network address is an internet protocol (IP) address. Further, the instructions may renew the IP address by performing a DHCP exchange.

In another aspect, the target AP and the source AP may have the same IP subnet configurations. Alternatively, the target AP and the source AP may have different IP subnet configurations.

In yet another aspect, the roaming manager may also include instructions to cause the processor to determine whether an SSID of the target AP is the same as an SSID of the source AP before determining and comparing the second identification information.

BRIEF DESCRIPTION OF THE DRAWINGS

Further features and advantages will become apparent from the following and more particular description of the preferred embodiments of the disclosure, as illustrated in the accompanying drawings, and in which like referenced characters generally refer to the same parts or elements throughout the views, and in which.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

Figure 1:
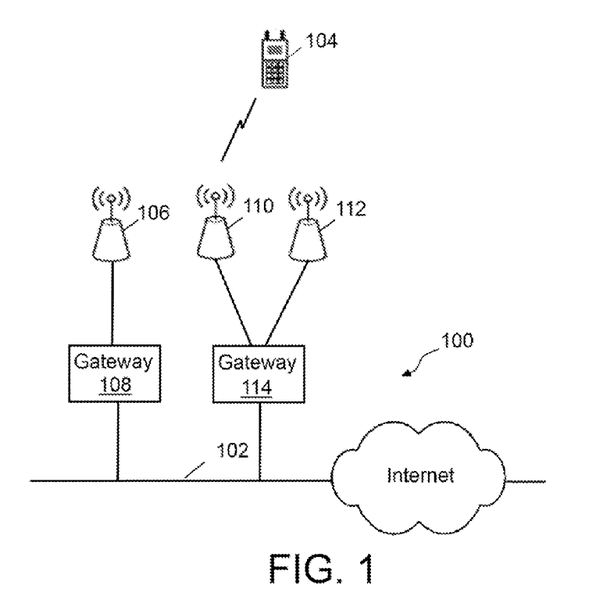
FIG. 1 schematically depicts a wide area network (WAN), according to one embodiment.

As noted above, a client device may connect wirelessly to a WAN such as the Internet through an AP. This disclosure includes systems and methods for roaming of such a client device between APs. To help illustrate these aspects, FIG. 1 schematically depicts a WAN 100, which may include a wired backbone 102. Access to the WAN may be provided through one or more gateways that are coupled to backbone 102 through a suitable network node, such as an edge router. In turn, one or more APs may provide wireless access to a client, such as wireless communications device 104. As shown, AP 106 may connect to WAN 100 through gateway 108, while APs 110 and 112 may connect through gateway 114.

When roaming conventionally, wireless communications device 104 may switch association from AP 110 to AP 112 as it moves out of range from the source AP and into range for the target AP. Notably, this type of roaming involves APs connected to a common gateway. As such, wireless communications device 104 may roam from AP 110 to AP 112 with the IP address assigned to wireless communications device 104 remaining valid, so that there is minimal or no disruption in layer 3 connectivity.

Nevertheless, it may be desirable for wireless communications device 104 to roam between APs that do not share a common gateway. For example, in the embodiment shown, wireless communications device 104 may roam from AP 110 connected to gateway 114 to AP 106 connected to gateway 108. Although such APs are not necessarily associated with each other, they may still have the same SSID. For example, the APs may have a default SSID that is the same or may employ a descriptive naming strategy that results in the same SSID being used. In addition to a common SSID, the source AP and the target AP may also have a common IP subnet configuration. Again, this may result in a number of scenarios, such as when consumer grade APs are installed with default settings. In other embodiments, the source AP and the target AP may have different IP subnet configurations.

Regardless, when the source AP and the target AP access the WAN through different gateways, a conventional roaming mobile device may experience a significant interruption in layer 3 connectivity. Conventional devices may be configured to assume that an IP address remains valid when roaming between APs having the same SSID. If the APs have a common IP subnet configuration, DHCP error control mechanisms may eventually restore some level of connectivity, such as after approximately 10-12 seconds. However, even when some connectivity is restored, the resulting configuration may be improper and compromise performance. If the APs have different IP subnet configurations, WAN connectivity may never be restored without user intervention, such as by manually disabling and then re-enabling the WLAN connection.

Accordingly, by following the techniques of this disclosure, wireless communications device 104 may provide improved roaming performance and experience reduced disruptions in connectivity when roaming between a source AP and a target AP connected to different gateways. Details regarding one embodiment of a wireless communications device 104 are depicted as high level schematic blocks in FIG. 2. Generally, wireless communications device 104 may employ an architecture in which the lower levels of the WLAN protocol stack are implemented in firmware and hardware modules of WLAN transceiver 202. WLAN transceiver 202 may include media access controller (MAC) 204 that performs functions related to the handling and processing of frames of data including verification, acknowledgment, routing, formatting and the like. Incoming and outgoing frames are exchanged between the MAC 204 and a physical (PHY) layer 206 that modulates the frames according to the wireless protocol being used and provides the analog processing and RF conversion necessary to provide transmission and reception of wireless signals. In one embodiment, MAC 106 and PHY layer 108 are configured to employ a suitable 802.11 protocol.

Figure 2:
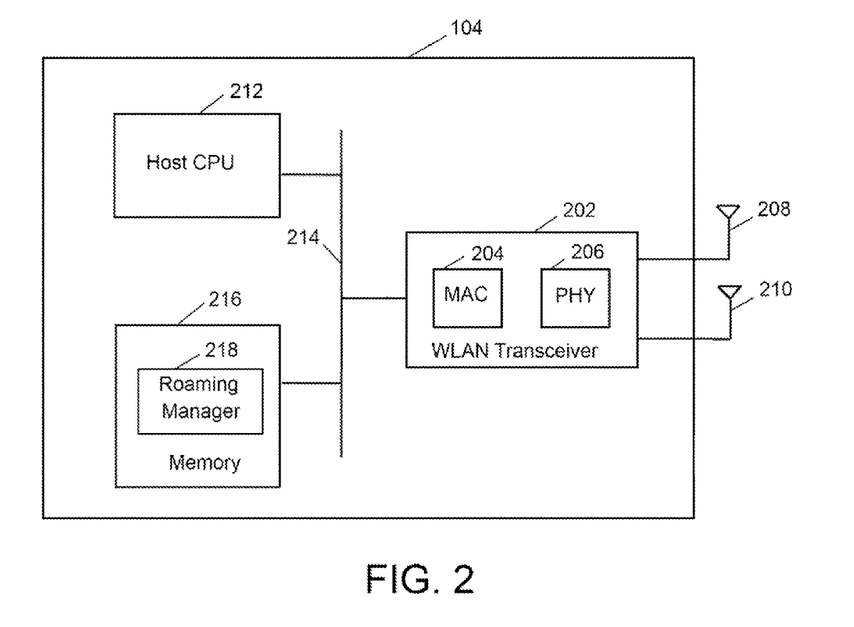
FIG. 2 schematically depicts functional blocks of a wireless communications device configured to roam between access points (APs) having different gateways, according to one embodiment.

In the depicted embodiment, WLAN transceiver 202 has associated antennas 208 and 210 and may be configured as a multiple input, multiple output (MIMO) system. In other embodiments, one or more antennas may be employed and/or shared among other wireless protocols as desired. Wireless communications device 104 may also include host CPU 212 configured to perform the various computations and operations involved with the functioning of wireless communications device 104. As shown, host CPU 212 is coupled to WLAN transceiver 202 through bus 214, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the WLAN and supplementary systems are generally implemented as software instructions, such as drivers, stored in memory 216, that may be accessed by host CPU 212 over bus 214. In some embodiments, wireless communications device 104 may include roaming manager 218, some or all portions of which may be implemented as software instructions stored in memory 216. In other embodiments, roaming manager 218 may be implemented using any desired combination of software, firmware and/or hardware.

In one aspect, roaming manager 218 may be configured to determine gateway identification information for source and target APs and to perform an IP address renewal process using that information. A suitable routine for performing the roaming process of this disclosure is represented by the flowchart depicted in FIG. 3. Beginning with 300, roaming manager 218 may determine identification information for a source AP. In the context of WAN 100 as shown in FIG. 1, wireless communications device 104 may initially be associated with AP 110 which is connected through gateway 114. In one embodiment, roaming manager 218 may determine identification information for gateway 114 by performing an address resolution protocol (ARP) exchange to determine the MAC address of the gateway. Next, in 302, wireless communications device 104 may roam from source AP 110 to target AP 106. Upon association with the target AP, roaming manager 218 may determine identification information for target AP gateway 108 in 304. Optionally, roaming manger 218 may check whether the SSID for the source and target APs is the same in 306. If not, the routine may exit as indicated by 308. If performed, the SSID check may be carried out either after 302, as shown, or prior to roaming from the source AP to the target AP as desired. Otherwise, or in embodiments in which 306 is not performed, roaming manager 218 may then compare the determined identification information in 310. Based, at least in part, on the respective identification information for source gateway 114 and target gateway 108, wireless communications device 104 may then determine the gateways are different and the routine may flow to 312. Since roaming manager 218 has determined the source AP gateway and target AP gateway are different, roaming manger 218 may perform a DHCP routine in 312 to renew the IP address of wireless communications device 104 to help ensure ongoing layer 3 connectivity. The routine may be repeated from 302 as desired when another roaming event occurs.

Figure 3:
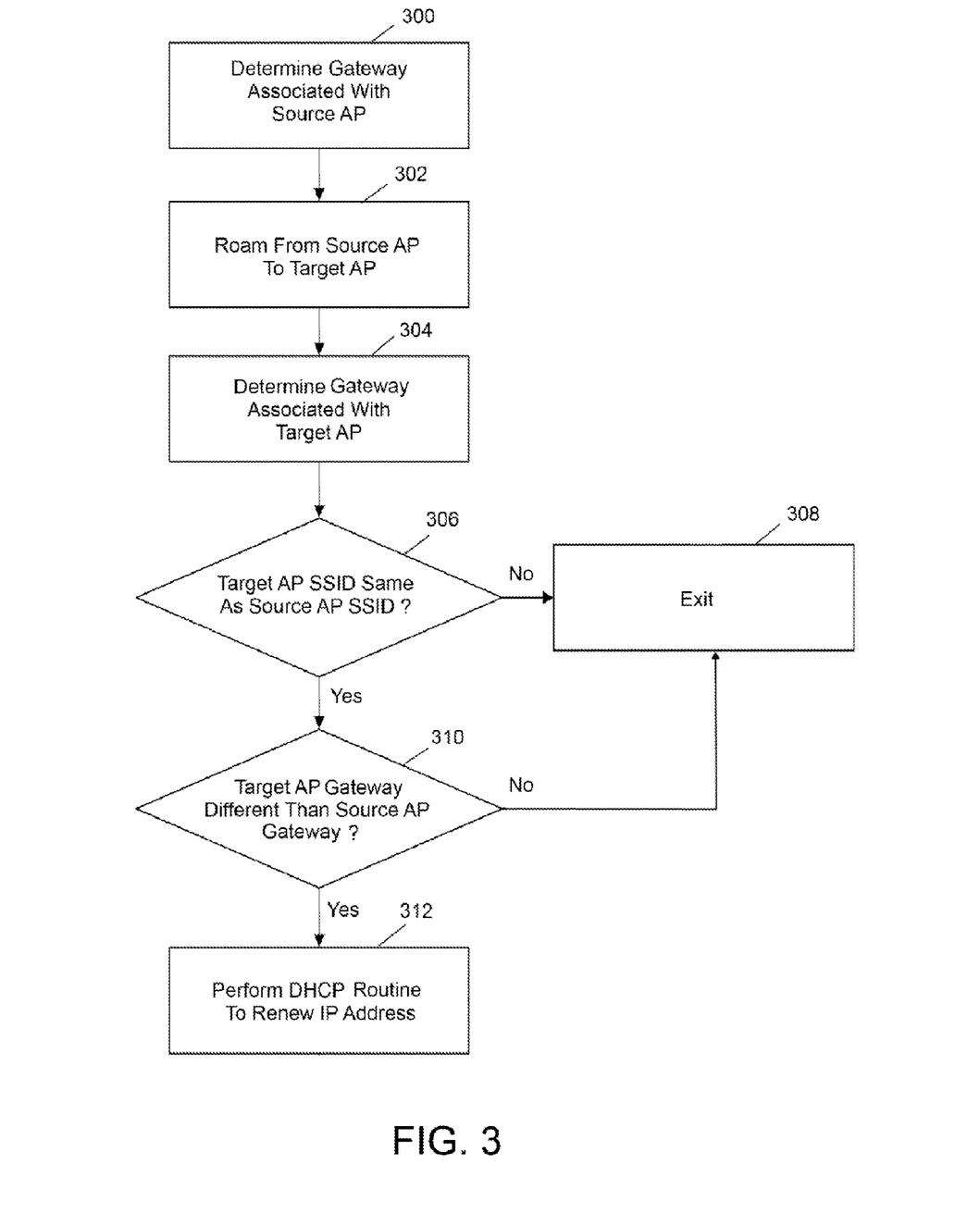
FIG. 3 depicts a flowchart showing a routine for roaming between APs having different gateways, according to one embodiment.

Alternatively, when wireless communications device 104 roams between APs that share a common gateway, such as by roaming from AP 110 to AP 112, roaming manager 218 may determine in 310 that the gateways are the same and the routine may exit to 308. For example, the MAC address obtained in 300 may match the MAC address obtained in 304. Upon verifying that the source and target APs have the same gateway, roaming manager 218 may determine that an IP address renewal is not necessary because layer 3 connectivity is not expected to be interrupted.

As noted, roaming manager 218 may determine gateway identification information using an ARP exchange. Such an exchange may include roam manager 218 generating an ARP request. In one aspect, an ARP request may include a broadcast message that is received by all local MAC address asking for a response from the owner of a given IP address. As such, roaming manger 218 may send an ARP request using the IP address of the default gateway. Upon receipt of the ARP request, the associated gateway may reply with a unicast message to wireless communications device 104 containing the gateway's MAC address. Since the ARP exchange may be conducted at the level of layer 2 connectivity, the protocol may be employed even if layer 3 connectivity is compromised. The size of the ARP request and response packets can be relatively small, for example, on the order of tens of bytes, and may represent minimal overhead to the network. Further, since an ARP exchange may involve only the request and response, the gateway identification information may be obtained relatively quickly.

A suitable DHCP exchange may include wireless communications device 104 broadcasting a DHCP discovery message, for example, employing the user datagram protocol (UDP). The DHCP Server is responsible for allocating IP addresses from a pool of available addresses. The DHCP Server may be implemented in a node on the local network or DHCP messages may be relayed by a local node to a remote DHCP Server, depending upon the configuration of the network. As such, communications with the DHCP Server may occur at layer 2 connectivity, allowing the IP address renewal routine to be performed even if layer 3 connectivity is interrupted.

The DHCP discovery message requests an IP lease from the DHCP Server and, optionally, may request reuse of the last IP addressed assigned to wireless communications device 104. After receiving the DHCP discover message, the DHCP Server may respond with a DHCP offer message, specifying relevant configuration parameters. Accordingly, wireless communications device 104 may then return a DHCP request using those configuration parameters, which the DHCP Server may accept and return a DHCP acknowledgement message to complete the exchange.

As desired, roaming manager 218 may also be configured to trigger IP address renewal through DHCP anytime the determined identification information does not indicate the gateways of the source and target APs are the same. For example, roaming manager 218 may perform a DHCP routine after a suitable waiting period if a response to the ARP request is not received or if identification information regarding the source AP gateway is unavailable after obtaining identification of the target AP.

Figure 4:
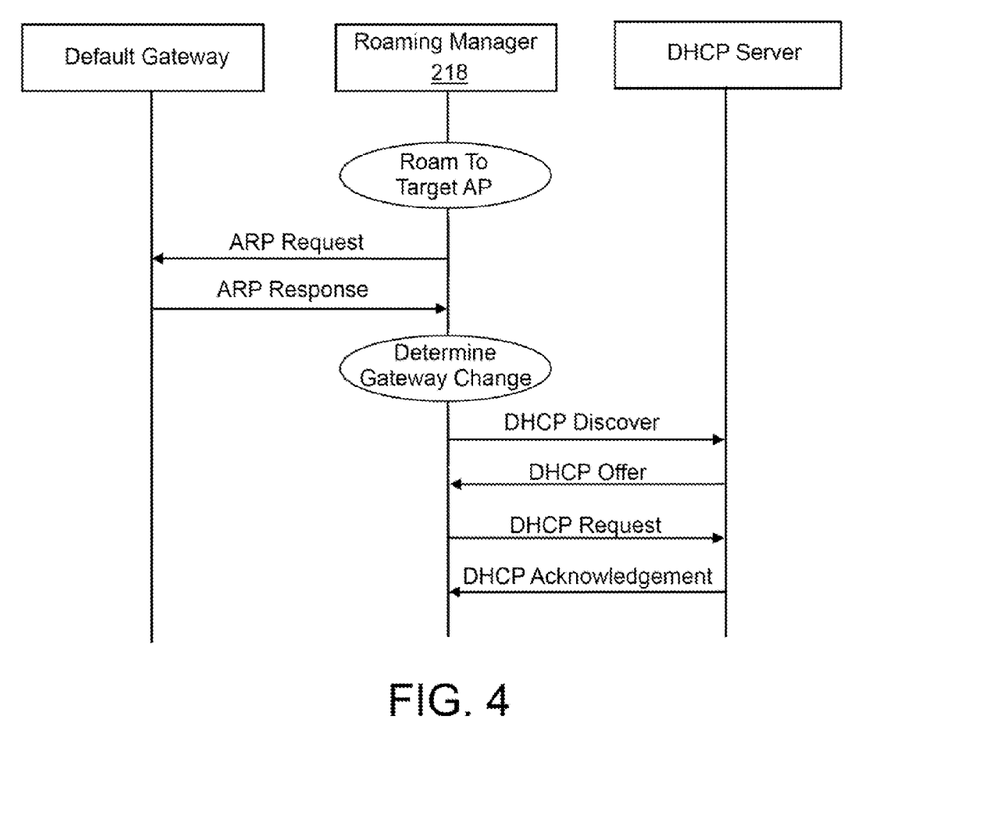
FIG. 4 depicts a sequence diagram showing information exchange after roaming between APs having different gateways, according to one embodiment.

One embodiment showing the exchange of information following a roaming procedure between APs having different gateways is shown in the sequence diagram shown of FIG. 4. After detecting a roam to a target AP, roaming manager 218 may initiate an ARP exchange with the gateway of the target AP. After receiving the MAC address of the gateway of the target AP and determining that it is different than the gateway of the source AP, roaming manager 218 may perform a DHCP exchange with the DHCP server responsible for the local network as described above. The DHCP exchange may renew the IP address of wireless communications device 104, restoring layer 3 connectivity that may have been disrupted prior to the renewal.

Performance in test scenarios indicates that the roaming processes of this disclosure may be used to significantly reduce or minimize interruptions to layer 3 connectivity. When roaming between APs having different gateways but the same IP subnet configuration, conventional client devices exhibited delays ranging from 20 to 25.6 seconds before communications involving layer 3 connectivity could be performed. As noted above, even when some degree of connectivity is restored, performance may be compromised due to incorrect routing information resulting from the changed gateway. In contrast, a device configured to employ the roaming techniques of this disclosure exhibited a delay of less than 866 ms and full layer 3 connectivity was restored. Further, when roaming between APs having different gateways and different IP subnet configurations, conventional client devices were unable to automatically restore layer 3 connectivity. Rather, manual disassociation and reassociation of the client device to the AP was required to restore connectivity. For comparison, a device configured to employ the roaming techniques of this disclosure was able to restore full layer 3 connectivity in up to approximately 3.4 seconds, such as in the range of 2 to 2.5 seconds. In addition, determination of gateway identification information adds little or no time to the roaming process when the source and target APs have the same gateway. A device using the techniques of this disclosure exhibited a delay within the same range as devices employing conventional roaming processes.

Described herein are presently preferred embodiments. However, one skilled in the art that pertains to the present embodiments will understand that the principles of this disclosure can be extended easily with appropriate modifications to other applications.

What is claimed is:

1. A method for wireless communication in a wireless communications device roaming from a source access point (AP) to a target AP, comprising:
   determining first identification information for a gateway of the source AP;
   roaming from the source AP to a target AP;
   determining second identification information for a gateway of the target AP using an address resolution protocol (ARP) exchange;
   comparing the first identification information and the second identification information; and
   renewing a network address of the wireless communications device when the first identification information and the second identification information indicates the gateway of the target AP is not the same as the gateway of the source AP, wherein roaming from the source AP to a target AP disrupts layer 3 connectivity and wherein renewing the network address of the wireless communications device restores layer 3 connectivity.

2. The method of claim 1, wherein determining second identification information for the gateway of the target AP comprises obtaining a media access control (MAC) address of the gateway of the target AP.

3. The method of claim 1, wherein the network address is an internet protocol (IP) address.

4. The method of claim 3, wherein renewing the IP address comprises performing a dynamic host configuration protocol (DHCP) exchange.

5. The method of claim 1, wherein the target AP and the source AP have the same IP subnet configurations.

6. The method of claim 1, wherein the target AP and the source AP have different IP subnet configurations.

7. The method of claim 1, further comprising determining a service set identification (SSID) of the target AP is the same as an SSID of the source AP before determining the second identification information.

8. A wireless communications device for roaming from a source access point (AP) to a target AP, comprising a roaming manager configured to:
   determine first identification information for a gateway of the source AP;
   determine a service set identification (SSID) of the target AP is the same as an SSID of the source AP;
   determine second identification information for a gateway of the target AP using an address resolution protocol (ARP) exchange; and
   renew a network address of the wireless communications device when the first identification information and the second identification information indicates the gateway of the target AP is not the same as the gateway of the source AP, such that when roaming from the source AP to a target AP disrupts layer 3 connectivity, the renewal of the network address of the wireless communications device restores layer 3 connectivity.

9. The wireless communications device of claim 8, wherein the roaming manager determines second identification information for the gateway of the target AP by obtaining a media access control (MAC) address of the gateway of the target AP.

10. The wireless communications device of claim 8, wherein the network address is an internet protocol (IP) address.

11. The wireless communications device of claim 10, wherein the roaming manager renews the IP address using a dynamic host configuration protocol (DHCP).

12. The wireless communications device of claim 8, wherein the target AP and the source AP have the same IP subnet configurations.

13. The wireless communications device of claim 8, wherein the target AP and the source AP have different IP subnet configurations.

14. The wireless communications device of claim 8, wherein the roaming manager determines a service set identification (SSID) of the target AP is the same as an SSID of the source AP before determining the second identification information.

15. A non-transitory processor-readable storage medium for a wireless communications device roaming from a source access point (AP) to a target AP, the processor-readable storage medium having instructions thereon, when executed by a processor, to cause the wireless communications device to:
  determine first identification information for a gateway of the source AP;
  determine a service set identification (SSID) of the target AP is the same as an SSID of the source AP;
  determine second identification information for a gateway of the target AP using an address resolution protocol (ARP) exchange; and
  renew a network address of the wireless communications device when the first identification information and the second identification information indicates the gateway of the target AP is not the same as the gateway of the source AP, such that when roaming from the source AP to a target AP disrupts layer 3 connectivity, the renewal of the network address of the wireless communications device restores layer 3 connectivity.

16. The non-transitory processor-readable storage medium of claim 15, wherein the instructions to determine second identification information for the gateway of the target AP obtain a media access control (MAC) address of the gateway of the target AP.

17. The non-transitory processor-readable storage medium of claim 15, wherein the network address is an internet protocol (IP) address.

18. The non-transitory processor-readable storage medium of claim 17, wherein the instructions to renew the IP address use a dynamic host configuration protocol (DHCP).

19. The non-transitory processor-readable storage medium of claim 15, wherein the target AP and the source AP have the same IP subnet configurations.

20. The non-transitory processor-readable storage medium of claim 15, wherein the target AP and the source AP have different IP subnet configurations.

21. The non-transitory processor-readable storage medium of claim 15, further comprising instructions to cause the processor to determine a service set identification (SSID) of the target AP is the same as an SSID of the source AP before determining the second identification information.

* * * * *